(12) United States Patent
Jang et al.

(10) Patent No.: US 9,022,777 B2
(45) Date of Patent: May 5, 2015

(54) INJECTION MOLDING APPARATUS HAVING AN INNER MOLD WITH A PLURALITY OF INNER PARTS

(71) Applicant: Hyundai Motor Company, Seoul (KR)

(72) Inventors: Dae Won Jang, Gyeonggi-do (KR); Sung Bae Jang, Gyeonggi-do (KR); Hee Gon Kang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 13/829,343

(22) Filed: Mar. 14, 2013

(65) Prior Publication Data

US 2014/0178523 A1 Jun. 26, 2014

(30) Foreign Application Priority Data

Dec. 26, 2012 (KR) .................. 10-2012-0153742

(51) Int. Cl.
| | |
|---|---|
| *B29C 45/44* | (2006.01) |
| *B29C 45/26* | (2006.01) |
| *B29C 37/00* | (2006.01) |
| *B29C 45/40* | (2006.01) |
| *B29L 31/00* | (2006.01) |
| *B29K 105/12* | (2006.01) |

(52) U.S. Cl.
CPC .............. *B29C 45/2614* (2013.01); *B29C 45/44* (2013.01); *B29C 37/0003* (2013.01); *B29C 45/4005* (2013.01); *B29L 2031/7742* (2013.01); *B29C 45/4421* (2013.01); *B29K 2105/12* (2013.01); *Y10S 425/058* (2013.01)

(58) Field of Classification Search
CPC ........................... B29C 45/4005; B29C 45/44
USPC ........................ 425/556, DIG. 58; 264/334
See application file for complete search history.

(56) References Cited

U.S. PATENT DOCUMENTS

| | | |
|---|---|---|
| 4,728,474 A | 3/1988 | Beall |
| 2007/0098831 A1* | 5/2007 | Yoon ............................ 425/190 |

FOREIGN PATENT DOCUMENTS

| | | | |
|---|---|---|---|
| JP | 63-194914 | * | 8/1988 |
| JP | 07-108620 | | 4/1995 |
| JP | 2004-160879 | | 6/2004 |
| JP | 2005-035195 | | 2/2005 |
| KR | 10-2010-0090824 | | 8/2010 |

* cited by examiner

*Primary Examiner* — Tim Heitbrink
(74) *Attorney, Agent, or Firm* — Mintz Levin Cohn Ferris Glovsky and Popeo, P.C.; Peter F. Corless

(57) ABSTRACT

Disclosed herein is an injection molding apparatus. That apparatus includes an axially extending bar shaped support bar and an inner mold that has a plurality of internal parts surrounding the support bar and is axially divided into a plurality of parts in which one or more corresponding parts in the inner parts have an inner circumferential surface width the same or larger than an outer circumferential surface width. The apparatus further includes an outer mold that has a plurality of axially divided external parts surrounding the inner mold and has a space between the inner circumferential surface of the outer mold and the outer circumferential surface of the inner mold.

6 Claims, 6 Drawing Sheets

INJECTION MOLDING APPARATUS HAVING AN INNER MOLD WITH A PLURALITY OF INNER PARTS

CROSS-REFERENCE TO RELATED APPLICATION

This application claims under 35 U.S.C. §119(a) the benefit of Korean Patent Application No. 10-2012-0153742 filed Dec. 26, 2012, the entire contents of which are incorporated herein by reference.

BACKGROUND (a) Technical Field

The present invention relates to an injection molding apparatus that forms injection moldings in various shapes, using various materials, by injection molding, for composite molds.

(b) Background Art

Recently, environment friendly vehicles have been developed due to the increased interest with the enhancement of environmental rules. The environment friendly vehicles have many advantages such as a measure against depletion of petroleum resources, reduction of carbon dioxide, reduction of volatile organic substances, and a countermeasure against restriction on recycling. In addition, substitute energy for petroleum fuels causing environmental pollution is used and methods of reducing the weight have been developed for the environment friendly vehicles.

Furthermore, studies have been conducted regarding maintaining durability and reducing weight of the vehicle, while maintaining strength of materials used to be similar to that of metallic parts, by using composite materials. A typical composite material used is CFRP (Carbon Fiber Reinforced Plastic), which is a composite material used for light structural members with high strength and elasticity. The CFRP is intensively used for developing ultra light vehicles while being used in many fields, including interior/exterior materials for vehicles bodies, frames, chassis, and engine parts.

In particular, since the springs in the suspension of vehicles receive load causing the springs to deform, strength and durability may be maintained at the same level as that of metal and weight may be reduced in comparison with steel or aluminum, by using the CFRP.

In manufacturing a spring from the CFRP in the related art, as shown in FIGS. 1 and 2, a carbon fiber and resin are formed and hardened into the shape of a spring by an outer mold 20 composed of a mandrel 10, an outer cope part 22 and an outer drag part 24 and the spring 30 is separated from the mold by rotation after the outer mold is removed. However, this manufacturing method is not capable of molding various shapes of springs having various functions such as a conical spring and a side load spring. In addition, the spring may be separated from the mandrel 10 by rotation.

The description provided above as a related art of the present invention is just for helping understanding the background of the present invention and should not be construed as being included in the related art known by those skilled in the art.

SUMMARY

The present invention provides an injection molding apparatus that may improve the layout and performance of springs used for a vehicle body by manufacturing various shapes of springs having different functions, using Carbon Fiber Reinforced Plastic (CFRP).

The present invention thus provides an injection molding apparatus that may include: an axially extending bar shaped support bar; an inner mold including internal parts surrounding the support bar and axially divided into a plurality of parts in which one or more corresponding parts in the inner parts have the widths of the inner circumferential surfaces the same or larger than the widths of the outer circumferential surfaces; and an outer mold including a plurality of axially divided external parts surrounding the inner mold and a forming space on the inner circumferential surface with the outer circumferential surface of the inner mold.

The support bar may be formed in a circular shape and may be formed such that the outer circumferential surface makes a straight line in the axial direction. The inner parts of the inner mold may have three parts and one corresponding part of the three inner parts may have a width of the inner circumferential surface that is the same or larger than the width of the outer circumferential surface.

The inner parts of the inner mold may have four parts and two corresponding parts of the three inner parts may have a width of the inner circumferential surface that is the same or larger than the width of the outer circumferential surface. The width from the outer circumferential surface to the inner circumferential surface of the inner mold may be smaller than the width of the support bar. The inner parts of the inner mold may be formed such that the width of the corresponding part is smaller than the widths of the remaining inner parts except the corresponding part.

The inner circumferential surface of the outer mold and the outer circumferential surface of the inner mod may be formed to correspond to the shape of a molding and may be formed to be in substantially close contact with each other.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
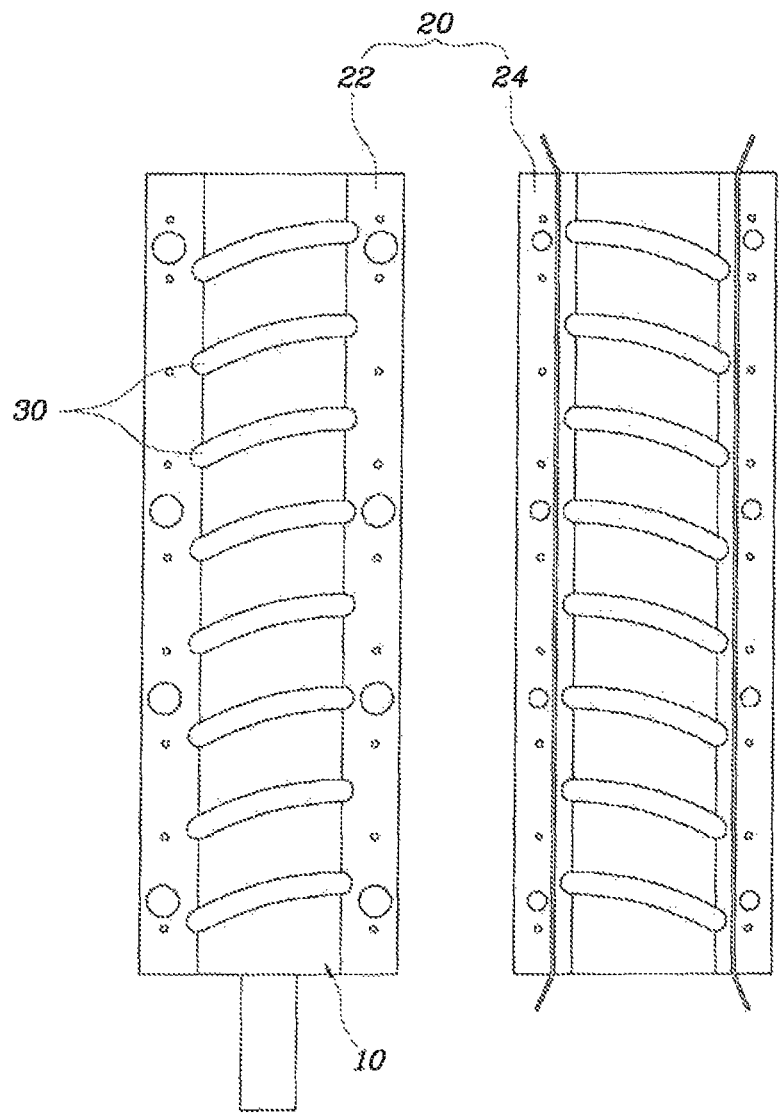
FIG. 1 is an exemplary view showing an injection molding apparatus according to the related art.
Figure 2:
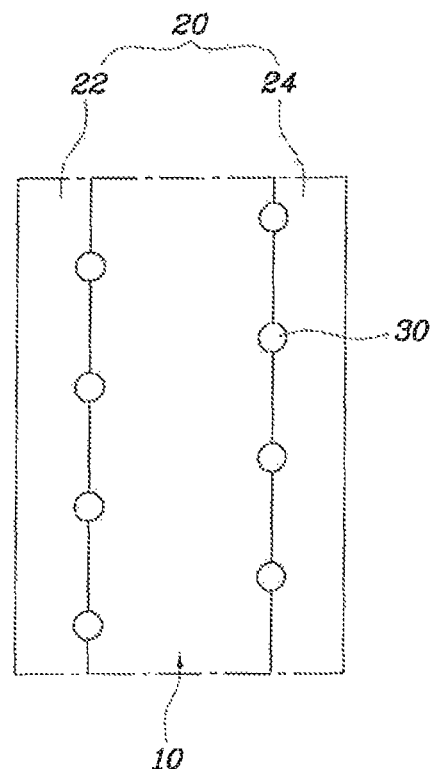
FIG. 2 is an exemplary cross-sectional view of the injection molding apparatus shown in FIG. 1 according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

An injection molding apparatus according to exemplary embodiments of the present invention is described hereafter with reference to the accompanying drawings.

Figure 3:
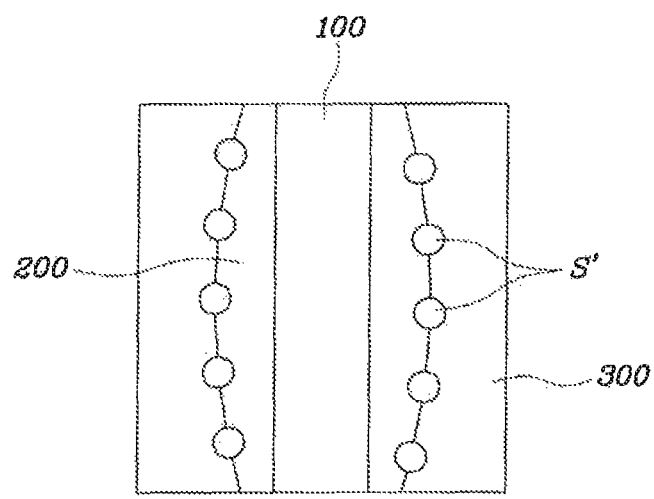
FIG. 3 is an exemplary cross-sectional view of an injection molding apparatus according to an exemplary embodiment of the present invention.

FIG. 3 is an exemplary cross-sectional view of an injection molding apparatus and the injection molding apparatus of the present invention may include: an axially extending bar shaped support bar 100; an inner mold 200 having inner parts 220 surrounding the support bar 100 and axially divided into a plurality of parts in which one or more corresponding parts 240 in the inner parts 220 have inner circumferential surface widths that are the same as or larger than their outer circumferential surface widths; and an outer mold 300 having of a plurality of axially divided outer parts 320 surrounding the inner mold 200 and a space S formed between the inner circumferential surface of the outer mold 300 and the outer circumferential surface of the inner mold 200.

As described above, the present invention may include the support bar 100, the inner mold 200, and the outer mold 300, and may be capable of manufacturing a vehicle body spring into various shapes from CFRP (Carbon Fiber Reinforced Plastic). Moreover, the present invention may inject various moldings by forming an injection space between the outer circumferential surface of the inner mold 200 and the inner circumferential surface of the outer mold 300. Furthermore, the present may improve the performance of a vehicle by manufacturing various kinds of spring S', using CFRP.

The support bar 100 of the present invention may be formed in a bar shape axially extending to be filled in the inner mold 200. The support bar 100 may operate as a support to allow the outer mold 300 and the inner mold 200 to be in contact with each other and may secure a space by axially removed from the inner mold 200 in injection of a molding to allow the inner mold 200 to removed inside the molding.

The support bar 100 may be formed in a circular shape and may be formed to allow the outer circumferential surface to form a substantially linear line in the axial direction. Since support bar 100 disposed inside the inner mold 200 may be removed axially from the inner mold 200 in injection of a molding, is the support bar 100 may be formed in a circular shape and the outer circumferential surface may form a substantially linear line in the axial direction, to allow the inner mold 200 to be removed. Alternatively, the support bar 100 may be formed in polygonal shapes rather than in circular shape, for the manufacturing design of a molding.

However, since the inner mold 200 and the support bar 100 are in substantially complete contact with each other in forming and a molding is manufactured under substantially high temperature and substantially high pressure, the angled end of the support bar 100 may deform, when the support bar is formed in a polygonal shape. Therefore, when the support bar 100 is formed in a circular shape the support bar 100 may be smoothly slid and be removed from the inner mold 200.

Moreover, the inner mold 200 may include of a plurality of axially divided inner parts 220 surrounding the support bar 100 and one or more corresponding parts 240 in the inner parts 220 may have inner circumferential surfaces widths the same or larger than the outer circumferential surface widths.

Since the inner mold 200 may be divided into the inner parts 220, the inner parts 200 may be separated and removed during injection of a molding and the corresponding part 240 may allow the inner parts 220 to be removed inside the molding. The corresponding part 240 may be removed inside the molding, to allow the corresponding part 240 to be removed inward by making the width of the inner circumferential surface the same as the width of the outer circumferential surface. The width of the inner circumferential and the width of the outer circumferential surface of the corresponding part 240 may be variously set based on the shape and design of a molding.

In removing the inner mold 200, the corresponding part 240 in the inner parts 220 may be removed through the empty space when the support bar 100 is removed, the inner parts 220 may be removed into the space formed by the separation of the corresponding part 240. The process of separating a molding will be described hereafter in detail with reference to the drawings.

On the other hand, the outer mold 300 may include a plurality of outer parts 320 surrounding the inner mold 200 and may include a space S formed between the inner circumferential surface of the outer mold 300 and the outer circumferential surface of the inner mold 200. Since the inner circumferential surface of the outer mold 300 and the outer circumferential surface of the inner mold 200 may be in contact, the shape of a spring S' may be formed by the space S. In addition, a resin inlet through which resin may be inserted may be formed in the outer mold 300, to allow carbon fiber and resin to be formed in the shape of the spring S' in the space S between the outer mold 300 and the inner mold 200, thereby manufacturing the spring S'. The resin inlet is generally known in the field of manufacturing a mold and thus the detailed description is not provided.

Figure 4:
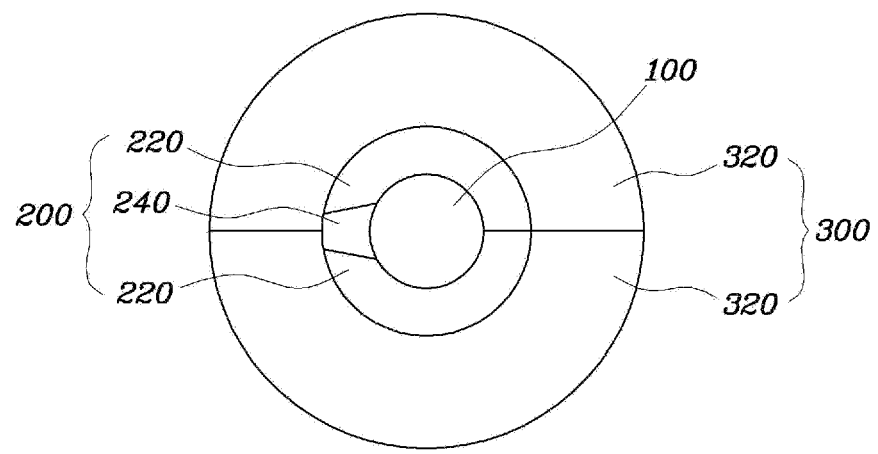
FIG. 4 is an exemplary view showing an injection molding apparatus according to an exemplary embodiment of the present invention.
Figure 5:
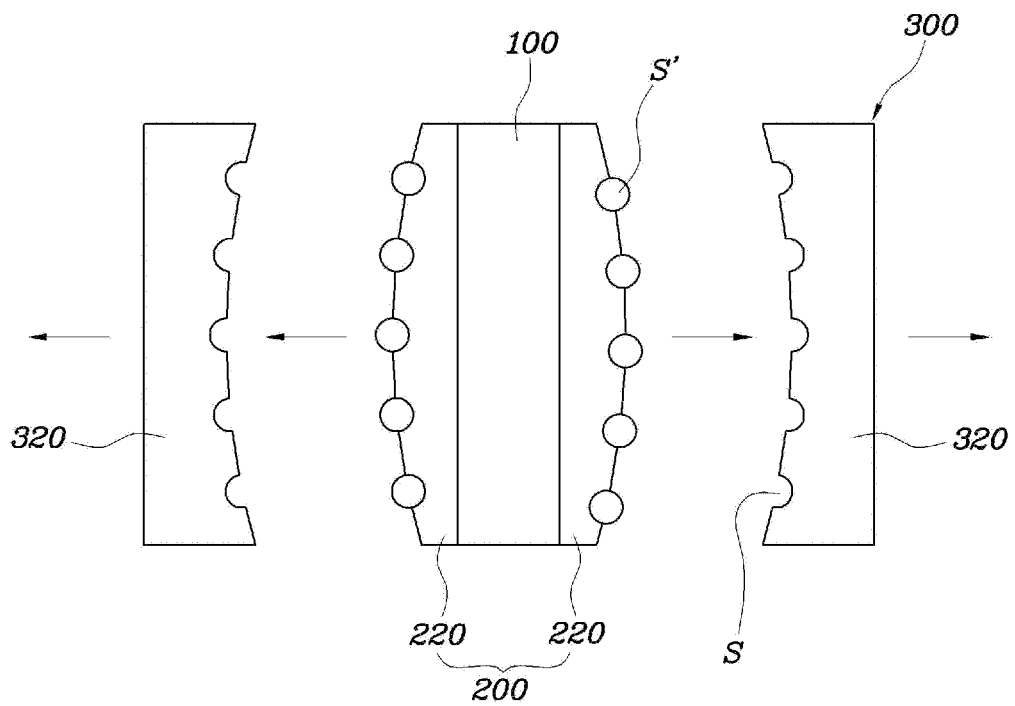
FIG. 5 is an exemplary view showing removal of an outer mold in the process of separating a molding from the injection molding apparatus shown in FIG. 4 according to an exemplary embodiment of the present invention.

The process of separating a molding by the present invention with the configuration described above is described in detail herein below. FIG. 4 is an exemplary view showing an injection molding apparatus according to a first embodiment of the present invention, in which the inner parts 220 of the inner mold 200 include three parts and one corresponding part 240 in the three parts may have inner circumferential surface widths the same or larger than the outer circumferential surface width.

In other words, the inner parts 220 of the inner mold 200 may be divided into the minimum number of parts when implementing the present invention. Specifically, there may be one corresponding part 240 in the three inner parts 220, so that, during injection of a molding, the corresponding part 240 may be separated into the empty space when the support bar 100 is removed and the other two inner parts 220 may be overlapped and separated through the space formed by the separation of the corresponding part 240. As the inner mold 200 is configured, as described above, it may be possible to simplify the structure by minimizing the number of inner parts 220 and simplify the manufacturing process.

The process of separating a molding is described in more detail with reference to FIGS. 4 to 8.

FIG. 4 shows an injection molding apparatus in which the inner parts 220 of the inner mold 200 described above include three parts and one corresponding part 240. Specifically FIG. 4 shows the inner mold 200 having a plurality of inner parts 220 surrounding the support bar 100 and the outer mold 300 having a plurality of outer parts 320 surrounding the inner mold 200. The corresponding part 240 in the inner parts 220 of the inner mold 200 may have an inner circumferential surface width the same or larger than the outer circumferential surface width to allow the corresponding part 240 to be removed inside the support bar 100.

The process of separating a molding by the injection molding apparatus is sequentially described. As seen from FIG. 5, the outer parts 320 of the outer mold 300 may be separated and removed from the inner mold 200. The outer mold 300 having the outer parts 320 may be separated according to the shape of a molding by separating the outer parts 320, when removed from the inner mold 200.

Figure 6:
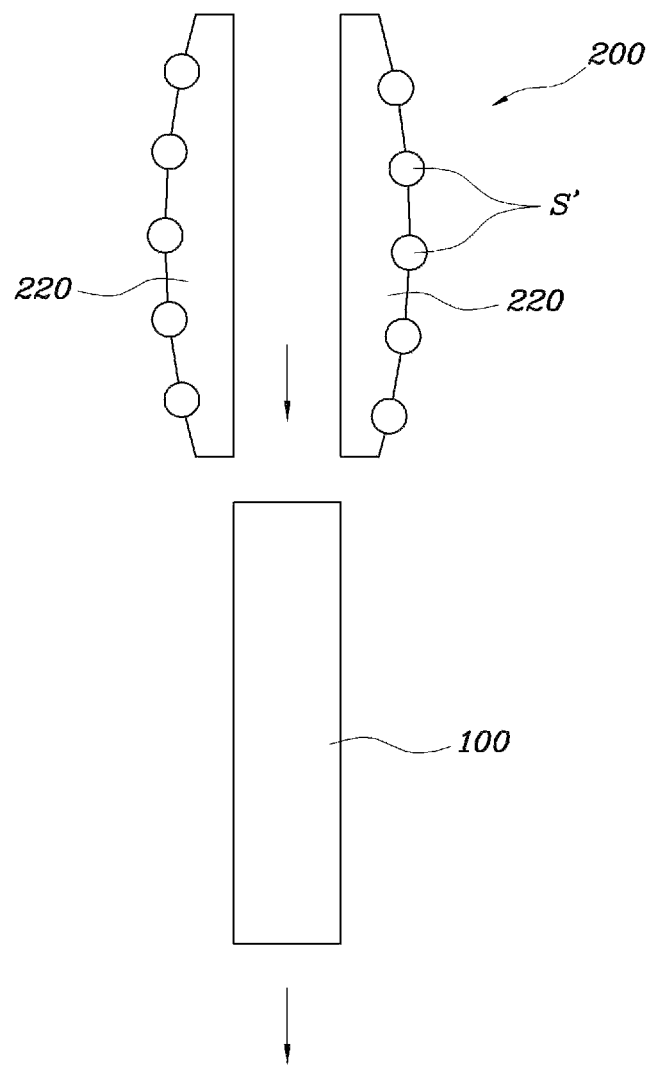
FIG. 6 is an exemplary view showing the removal of a support bar in the process of separating a molding from the injection molding apparatus shown in FIG. 4 according to an exemplary embodiment of the present invention.

Additionally, the support bar 100 may be removed from the inner mold 200, as shown in FIG. 6. Since the outer circumferential surface may be in a substantially linear line in the axial direction, the support bar 100 may be axially slid and separated. As the support bar 100 is axially separated from the inner mold 200, an empty space may be formed inside the inner mold 200 by the separation of the support bar 100 and the inner parts 220 of the inner mold 200 may be removed through the empty space.

Figure 7:
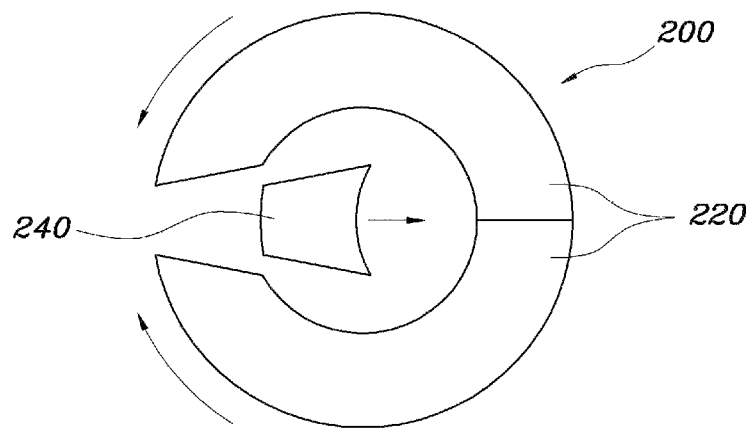
FIG. 7 is an exemplary view showing the removal of a corresponding part in the inner parts of an inner mold in the process of separating a molding from the injection molding apparatus shown in FIG. 4 according to an exemplary embodiment of the present invention.

In other words, as seen from FIG. 7, the corresponding part 240 in the inner parts 220 of the inner mold 200 may be removed through the empty space formed by the separation of the support bar 100 and may then axially be removed. As the corresponding part 240 of the inner mold 200 is removed and separated, the width of the inner mold 200 may decrease and the remaining inner parts 220 may be overlapped and removed through the empty space of the support bar 100 and separated.

Figure 8:
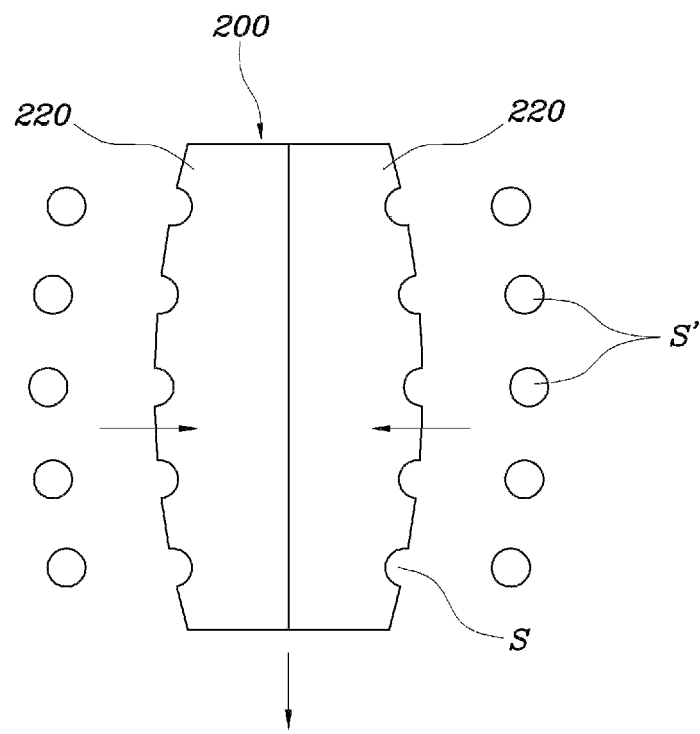
FIG. 8 is an exemplary view showing the removal of the inner parts of an inner mold in the process of separating a molding from the injection molding apparatus shown in FIG. 4 according to an exemplary embodiment of the present invention.

As the corresponding part 240 of the inner mold 200 is removed and separated, as seen from FIG. 8, the inner mold 200 having the remaining inner parts 220 may be overlapped and axially separated into the space when the support bar 100 is removed, to allow a molding to be injected.

Figure 9:
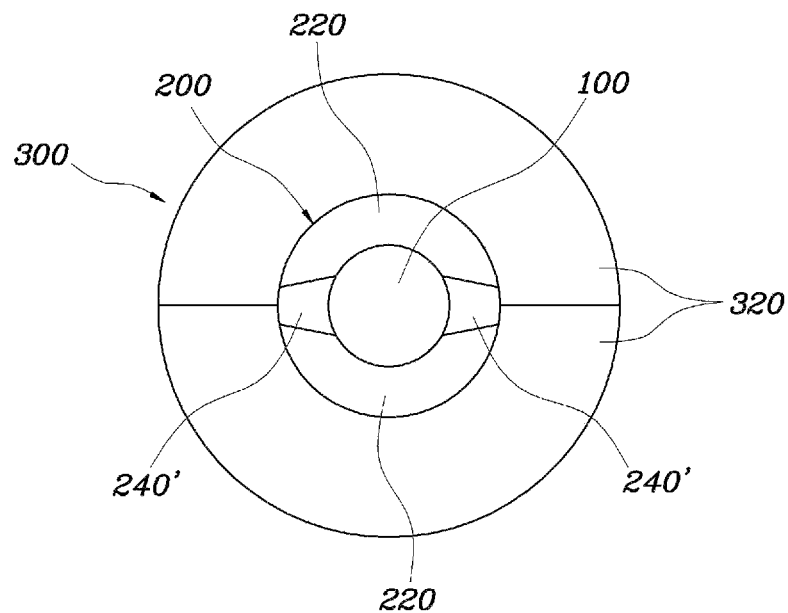
FIG. 9 is an exemplary view showing an injection molding apparatus according to another exemplary embodiment of the present invention.

On the other hand, as seen from FIG. 9, the inner parts 220 of the inner mold 200 may include four parts and two corresponding parts 240' in the inner parts may have inner circumferential surface widths the same or larger than the outer circumferential surface widths.

This embodiment of the present invention, may allow a molding to be manufactured in various shapes by providing two corresponding parts 240' in the inner parts 220 of the inner mold 200. In other words, as seen from FIG. 10, by providing two corresponding parts 240' in the four inner parts 220, during injection of a molding, the two corresponding parts 240' may be removed to an empty space when the support bar 100 is removed, and the two corresponding parts 240' may then be separated, to allow the remaining inner parts 220 to be overlapped and axially separated. According to the above configuration, it may be possible to increase the reduction range of the width of the inner mold 200 by removing and separating a plurality of corresponding parts to the empty space when the support bar 100 is removed.

Figure 10:
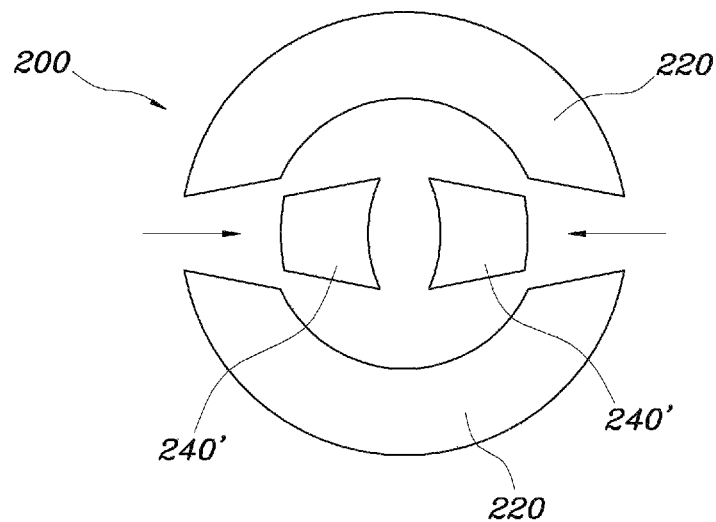
FIG. 10 is an exemplary view showing the removal of a corresponding part in the inner parts of an inner mold in the process of separating a molding from the injection molding apparatus shown in FIG. 9 according to an exemplary embodiment of the present invention.

The separation process of the second embodiment is the same as that of the first embodiment described above and the process shown in FIG. 7 may be substituted for the process shown in FIG. 10. The separation processes according to the embodiments described above may be selectively used based on the shape of a spring and the manufacturing process. Further, the number of the corresponding parts 240 in the inner parts 220 of the inner mold 200 may be variously set based on the shape of a spring and the manufacturing process. Moreover, the width from the outer circumferential surface to the inner circumferential surface of the inner mold 200 may be set to be smaller than width of the width of the support bar 100 to remove and separate the inner parts 220 of the inner mold 200 through the space formed by the support bar 100 separated from the inner mold 200.

The inner mold 200 of the present invention may be removed through the empty space formed by the separated support bar 100. However, when the width from the outer circumferential surface to the inner circumferential surface of the inner mold 200 is set to be larger than the width of the support bar 100, the inner mold 200 may only be removed to the space formed by the support bar 100. Further, since the space S may be formed between the outer mold 300 and the inner mold 200, separating the inner mold 200 may be performed by setting the width from the outer circumferential surface to the inner circumferential surface of the inner mold 200 to be smaller than the width of the support bar 100 such that the inner mold 200 may be axially separated after the inner parts 220 are removed.

On the other hand, the inner parts 220 of the inner mold 200 may be formed such that the width of the corresponding part 240 is smaller than the widths of the rest of the inner parts 220 except for the corresponding part 240. The inner parts 220 may be limited to be removed to the space formed by the separated support bar 100, when the width of the corresponding part 240 in the inner parts 220 of the inner mold 200 is larger than the width of the support bar 100.

Further, the corresponding part 240 need only to provide a sufficient space where the remaining inner parts 220 except for the corresponding part 240 may be removed and separated to the space formed by the separated support bar 100, thus the present invention may be implemented when the width of the corresponding part 240 is set larger than the support bar 100.

Further, the inner circumferential surface of the outer mold 300 and the outer circumferential surface of the inner mod 200 may be formed to correspond to the shape of a molding and may be formed to be in substantially close contact with each other. In other words, the inner circumferential surface of the outer mold 300 and the outer circumferential surface of the inner mod 200 may form the shape of a molding when in substantially close contact. In the present invention, carbon fiber and resin may be formed and hardened into the shape of the spring S' by the space S between the outer mold 300 and the inner mold 200, to allow the spring S' to be manufactured through the separation process described above by the molding apparatus.

The inner circumferential surface of the outer mold 300 and the outer circumferential surface of the inner mod 200 may be variously formed based on the shape of a molding and the space S may be formed to fit the shape of the spring S'.

The injection molding apparatus having the structure described above may include the support bar 100, the inner mold 200, and the outer mold 300, and according to the configuration, it may be possible to remove the outer mold 300, axially separate the support bar 100, and remove the remaining inner parts 220 inside a molding after removing the corresponding part 240 of the inner mold 200 from the molding, during injection of the molding.

Therefore, using the CFRP for manufacturing a spring allows various shapes of a spring with different functions to be manufactured, thus improving the layouts and performance of the springs to be used for vehicle bodies.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An injection molding apparatus comprising:
    an axially extending bar shaped support bar;
    an inner mold having a plurality of inner parts surrounding the support bar in which one or more corresponding parts in the inner parts have an inner circumferential surface width the same or larger than an outer circumferential surface width; and
    an outer mold having a plurality of axially divided external parts surrounding the inner mold and a space formed between the inner circumferential surface of the outer mold and the outer circumferential surface of the inner mold,
    wherein the inner parts of the inner mold include four parts, and two corresponding parts of the four inner parts have the inner circumferential surface widths the same as or larger than the outer circumferential surface widths, and
    the width from the outer circumferential surface to the inner circumferential surface of the inner mold is set to be smaller than a width of the support bar.

2. The apparatus of claim 1, wherein the support bar is formed in a circular shape, wherein the outer circumferential surface forms a straight line in the axial direction.

3. The apparatus of claim 1, wherein the inner parts of the inner mold includes three parts and one corresponding part of the three inner parts has the inner circumferential surface width the same or larger than the outer circumferential surface width.

4. The apparatus of claim 1, wherein the inner parts of the inner mold are formed to allow the width of the corresponding part to be smaller than the widths of the remaining inner parts.

5. The apparatus of claim 1, wherein the inner circumferential surface of the outer mold and the outer circumferential surface of the inner mod are formed to correspond to the shape of a molding and formed to be in close contact with each other.

6. An injection molding apparatus comprising:
    an axially extending bar shaped support bar;
    an inner mold having a plurality of inner parts surrounding the support bar in which one or more corresponding parts in the inner parts have an inner circumferential surface width the same or larger than an outer circumferential surface width; and
    an outer mold having a plurality of axially divided external parts surrounding the inner mold and a space formed between the inner circumferential surface of the outer mold and the outer circumferential surface of the inner mold,
    wherein the inner parts of the inner mold include three parts, and one corresponding part of the three inner parts has the inner circumferential surface width the same as or larger than the outer circumferential surface width, and
    the width from the outer circumferential surface to the inner circumferential surface of the inner mold is set to be smaller than a width of the support bar.

* * * * *